Patented June 26, 1928.

1,675,117

UNITED STATES PATENT OFFICE.

SIMON JOSEPH LUBOWSKY, OF JERSEY CITY, NEW JERSEY.

ELECTRICALLY-CONDUCTIVE TITANIUM OXIDE.

No Drawing. Application filed May 3, 1923. Serial No. 636,457.

In a companion application, Serial No. 607,726, filed December 18, 1922 Patent No. 1,567,445, I have disclosed and claimed a refractory, chemical-resisting material, comprising calcined rutile or titanium dioxide. I have since discovered that, if the titanium dioxide or the rutile be heated under certain non-oxidizing and reducing conditions, it gradually acquires a black or gray-black color, and undergoes a change in specific heat and certain other changes in its physical properties and characteristics, among which acquired characteristics are conductivity to electricity and to heat, which completely distinguish the new product from that described in the former application and adapt said new product to many uses to which the other type of calcined rutile or dioxide of titanium was inapplicable.

In carrying out the method of producing the new product, I grind or comminute titanium dioxide, preferably in the form of the mineral rutile, to the desired degree of fineness and heat it highly in a slightly reducing atmosphere. The black material produced will have all the characteristics mentioned above, of, for instance, conductivity to electricity and to heat without having passed through the state of liquid fusion.

In a practical embodiment of this simple form of the invention, therefore, I have obtained the desired results by heating the ground rutile in a crucible in a gas or oil fired furnace to approximately 800° C. to 1,000° C., and with oxygen excluded simply by the cover on the crucible.

It will be obvious that since the production of the material depends upon the degree of heat maintained with the correlated degree of exclusion of oxygen, the operation may be effected directly upon the hearth of a furnace of any suitable type.

As is the case with the particular product, as covered by my prior application, aforesaid, the black, converted rutile or titanium dioxide, resulting from the instant process, may be made into shapes and forms of various articles of manufacture either by shaping the rutile or the titanium dioxide and then heating to bring about this conversion or by forming the already converted material into the desired shapes with or without a binder. Because of the fact that the product is a good conductor of heat and of electricity, it will find many ready applications in the fields of electricity, electro-chemistry and electro-metallurgy, especially in the form of electrodes, conductors, containers, and the like, which may be subjected to contact with various chemicals which would adversely affect other similar electrical elements made from the usual metallic conductors.

What I claim is:

An electrical conductor comprising titanium dioxide, which has been subjected to a high heat in a reducing atmosphere, said titanium dioxide having a gray-black color.

In testimony whereof I affix my signature.

SIMON JOSEPH LUBOWSKY.